United States Patent
Liwell et al.

(10) Patent No.: US 7,877,087 B2
(45) Date of Patent: Jan. 25, 2011

(54) METHODS OF REMOTELY UPDATING LISTS IN MOBILE TERMINALS AND RELATED SYSTEMS AND COMPUTER PROGRAM PRODUCTS

(75) Inventors: Marcus Liwell, Malmo (SE); Henrik Baard, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 749 days.

(21) Appl. No.: 11/835,484

(22) Filed: Aug. 8, 2007

(65) Prior Publication Data

US 2009/0029693 A1    Jan. 29, 2009

Related U.S. Application Data

(60) Provisional application No. 60/951,777, filed on Jul. 25, 2007.

(51) Int. Cl.
*H04M 3/00* (2006.01)
*H04M 17/00* (2006.01)
*H04B 1/10* (2006.01)

(52) U.S. Cl. .................. 455/419; 455/304; 379/142.06

(58) Field of Classification Search ................ 455/304, 455/466; 379/142.06, 201.02, 142.04, 201.11; 725/25
See application file for complete search history.

(56) References Cited

U.S. PATENT DOCUMENTS

| 7,711,344 | B1 * | 5/2010 | Mahn ......................... 455/304 |
| 2003/0131353 | A1 * | 7/2003 | Blom et al. .................... 725/25 |
| 2007/0073874 | A1 | 3/2007 | Moghaddam et al. |
| 2008/0112553 | A1 * | 5/2008 | Chen et al. ............. 379/142.06 |

FOREIGN PATENT DOCUMENTS

| WO | WO 01/33889 A1 | 5/2001 |
| WO | WO 2006/002048 A2 | 4/2008 |

* cited by examiner

*Primary Examiner*—Charles N Appiah
*Assistant Examiner*—Kiet Doan
(74) *Attorney, Agent, or Firm*—Myers Bigel Sibley & Sajovec, P.A.

(57) ABSTRACT

Operating a mobile terminal may include providing a list in memory of the mobile terminal with the list including at least one identification of a communications device remote from the mobile terminal. An update for the list may be received from outside the mobile terminal over a wireless link, and the list may be automatically updated in the memory of the mobile terminal after receiving the update from outside the mobile terminal. Communications may then be moderated based on the list in the memory. Related systems and computer program products are also discussed.

27 Claims, 3 Drawing Sheets

US 7,877,087 B2

METHODS OF REMOTELY UPDATING LISTS IN MOBILE TERMINALS AND RELATED SYSTEMS AND COMPUTER PROGRAM PRODUCTS

RELATED APPLICATION

The present application claims the benefit of priority from U.S. Provisional Application No. 60/951,777 filed Jul. 25, 2007, the disclosure of which is hereby incorporated herein in its entirety by reference.

FIELD OF THE INVENTION

The present invention relates to the field of electronics, and more particularly to mobile terminals providing communications and related systems and computer program products.

BACKGROUND

In a mobile communications terminal, such as a radiotelephone, a Personal Digital Assistant (PDA), a wireless e-mail device (e.g., a Blackberry™ handheld device), a wireless handheld Internet browser, and/or combinations thereof, a list (such as a whitelist) may be used to identify acceptable recipients/sources of information transmitted/received from/at the mobile communications device. More particularly, one or more of these lists may be programmed into the mobile communications device (e.g., by the manufacturer and/or service provider) before being provided to a user/customer. Accordingly, transmission of sensitive material (such as identification information, financial information, etc.) to untrustworthy recipients and/or receipt of undesired material (such as viruses, spam, etc.) from untrustworthy sources may be reduced.

SUMMARY

According to some embodiments of the present invention, methods of operating a mobile terminal may include providing a whitelist/blacklist in memory of the mobile terminal with the whitelist/blacklist including at least one identification of a communications device remote from the mobile terminal. An update for the whitelist/blacklist may be received from outside the mobile terminal over a wireless link, and the whitelist/blacklist may be automatically updated in the memory of the mobile terminal after receiving the update from outside the mobile terminal. Moreover, communications may be moderated based on the whitelist/blacklist in the memory.

The whitelist/blacklist may be a whitelist for a specified communications interaction, and moderating communications may include allowing the specified communications interaction with remote communications devices having respective identifications included in the whitelist. The whitelist/blacklist may be a blacklist for a specified communications interaction, and moderating communication may include blocking the specified communications interaction with remote communications devices having respective identifications included in the blacklist.

Moderating communications may include moderating provision of an identification of the mobile terminal with a remote communications device based on the whitelist/blacklist in the memory. Moderating communications may include moderating acceptance of a specified data type at the mobile terminal from a remote communications device based on the whitelist/blacklist in the memory. Moderating communications may include blocking communications with a remote communications device based on the whitelist/blacklist in the memory.

Receiving the update may include receiving a new identification of a communications device remote from the mobile terminal not previously included in the whitelist/blacklist, and automatically updating the whitelist/blacklist may include adding the new identification to the whitelist/blacklist in memory without user intervention after receiving the update from outside the mobile terminal. Receiving the update may include receiving an existing identification of a communications device remote from the mobile terminal already included in the whitelist/blacklist, and automatically updating the whitelist/blacklist may include removing the existing identification from the whitelist/blacklist in memory without user intervention after receiving the update from outside the mobile terminal. Receiving the update may include receiving an identification of a communications device remote from the mobile terminal together with a time constraint associated with the identification of the communications device remote from the user terminal.

Before receiving an update for the whitelist/blacklist, a communication may be established with a remote server using a browser application of the mobile terminal, and receiving the update may include receiving the update from the remote server using the browser application. For example, receiving the update from the remote server may include receiving the update as a content object such as a Ticket object, and/or the content object may have an MIME (Multipurpose Internet Mail Extensions) type. Receiving the update may include receiving the update according to an HTTP (Hypertext Transfer Protocol) protocol and/or an OBEX (OBject EXchange) protocol. In an alternative, the update may be received as an SMS (Short Message Service) message.

Providing a whitelist/blacklist may include providing first and second whitelists/blacklists with each whitelist/blacklist including at least one identification of a communications device remote from the mobile terminal. Receiving an update may include receiving a first update for the first whitelist/blacklist from a first source remote from the mobile terminal and receiving a second update for the second whitelist/blacklist from a second source remote from the mobile terminal. Automatically updating the whitelist/blacklist may include automatically updating the first whitelist/blacklist using the first update received from the first source and automatically updating the second whitelist/blacklist using the second update received from the second source. Moreover, updating the first whitelist/blacklist responsive to updates received from the second source may be blocked, and updating the second whitelist/blacklist responsive to updates received from the first source may be blocked.

The first whitelist/blacklist may be associated with a first verification and the second whitelist/blacklist may be associated with a second verification different than the first verification. Automatically updating the first whitelist/blacklist may include verifying the first update according to the first verification, and automatically updating the second whitelist/blacklist may include verifying the second update according to the second verification. Moreover, the verifications may be pre-configured at production. The first update may include a first ticket object with a first signaling portion, the second update may include a second ticket object with a second signaling portion, verifying the first update may include verifying the first update using the first signaling portion according to the first verification, and verifying the second update may include verifying the second update using the second signaling portion according to the first verification.

The whitelist/blacklist may include a plurality of identifications corresponding to a respective plurality of communications devices remote from the mobile terminal, the update may include one of the identifications and an activity type, and automatically updating the whitelist/blacklist may include updating the whitelist/blacklist based on the identification and the activity type included in the update. The activity type, for example, may include one of a delete activity type, a modify activity type, or an add activity type. The activity type may include the delete activity type, and updating the whitelist/blacklist may include deleting the identification included in the update from the whitelist/blacklist. The activity type may include the modify activity type, and updating the whitelist/blacklist may include modifying information in the whitelist/blacklist associated with the identification included in the update. The update may include a time constraint, and modifying information in the whitelist/blacklist may include providing the time constraint for the identification in the whitelist/blacklist. The activity type may include the add activity type, and updating the whitelist/blacklist may include adding the identification included in the update to the whitelist/blacklist.

Before automatically updating the whitelist/blacklist, verification that the update is received from a trusted source may be performed. Moreover, the mobile terminal may be a cellular radiotelephone configured to provide a radiotelephone communication with another terminal.

According to some other embodiments of the present invention, a mobile terminal may include a transceiver configured to provide wireless communications, a processor coupled to the transceiver, and a memory coupled to the processor. More particularly, the memory may include a whitelist/blacklist having at least one identification of a communications device remote from the mobile terminal. Moreover, the transceiver may be configured to receive an update for the whitelist/blacklist from outside the mobile terminal over a wireless link, and the processor may be configured to automatically update the whitelist/blacklist in the memory of the mobile terminal after receiving the update from outside the mobile terminal. The processor may be further configured to moderate communications based on the whitelist/blacklist in the memory.

According to still other embodiments of the present invention, a computer program product may be configured to operate a mobile terminal, and the computer program product may include a computer readable medium having computer readable program code embodied therein. More particularly, the computer readable program code may include computer readable program code configured to access a whitelist/blacklist in memory of the mobile terminal with the whitelist/blacklist may include at least one identification of a communications device remote from the mobile terminal. In addition, the computer readable program code may include computer readable program code configured to receive an update for the whitelist/blacklist from outside the mobile terminal over a wireless link. The computer readable program code may also include computer readable program code configured to automatically update the whitelist/blacklist in the memory of the mobile terminal after receiving the update from outside the mobile terminal. The computer readable program code may further include computer readable program code configured to moderate communications based on the whitelist/blacklist in the memory.

DETAILED DESCRIPTION

Figure 1:
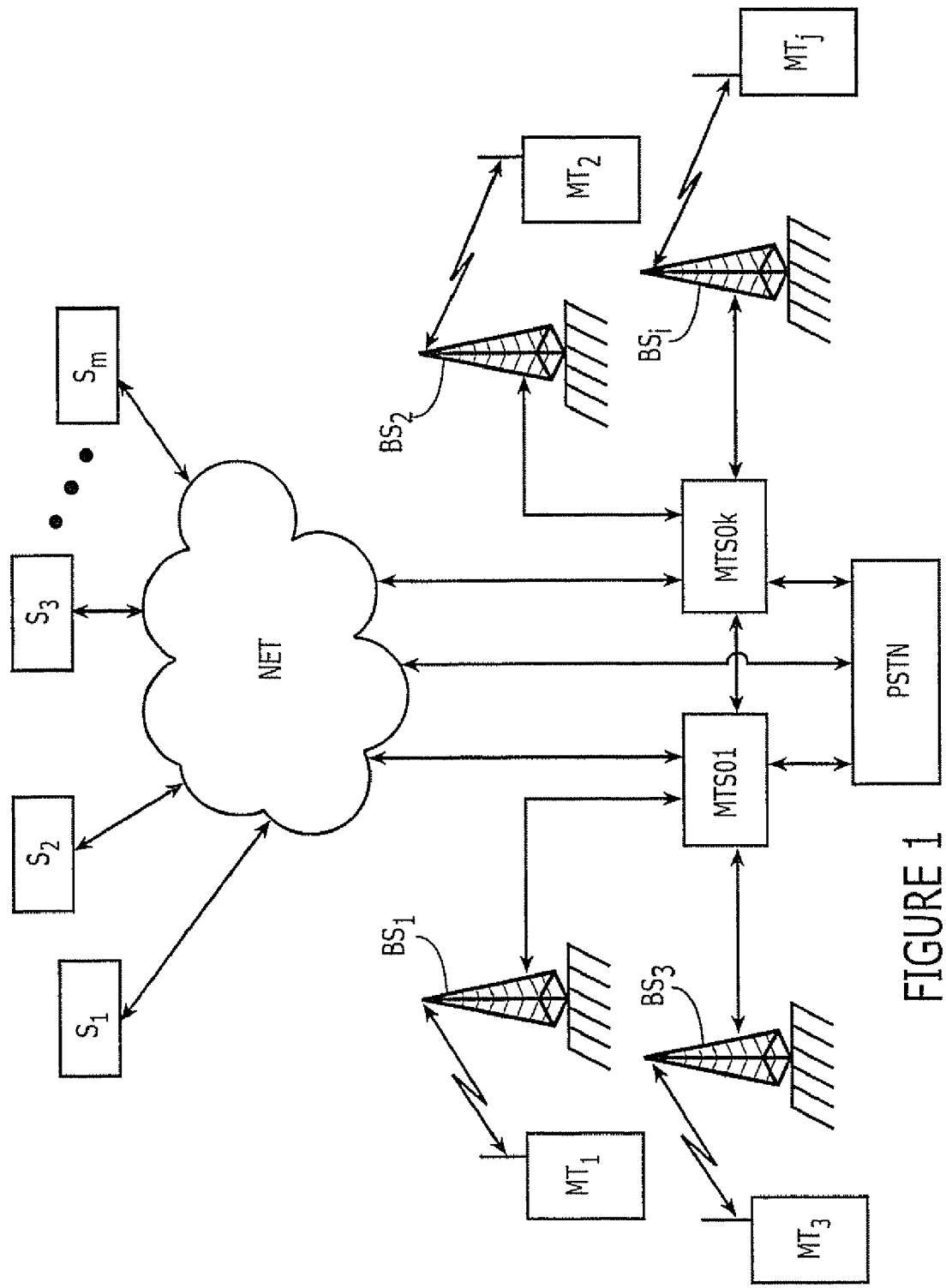
FIG. 1 is a block diagram illustrating communications systems including mobile terminals according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first frequency below could be termed a second frequency, and similarly, a second frequency may be termed a first frequency without departing from the teachings of the present invention. As used herein, the term "and/or" includes any and all combinations of one or more of the associated listed items. The symbol "/" is also used as a shorthand notation for "and/or".

Various embodiments of the present invention are described below with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

FIG. 1 is a block diagram illustrating communications systems including mobile terminals according to some embodiments of the present invention. A cellular radiotelephone communications system, for example, may include a plurality of base stations BS1-BSi and a plurality of mobile telephone switching offices MTSO1-MTSOk supporting communications for a plurality of mobile terminals MT1-MTj. Moreover, the radiotelephone communications system may be coupled to a public switched telephone network PSTN to provide communications between mobile terminals MT1-MTj and conventional land-line telephones. The radiotelephone communications system may also be coupled to a data network NET (such as the Internet) to provide communications between mobile terminals MT1-MTj and one or more servers S1-Sm. Each of the mobile terminals MT1-MTj may provide one or more of cellular radiotelephone communications, short message service (SMS) communications, multimedia message service (MMS) communications, Internet browsing, text messaging communication, e-mail communications, etc.

Figure 2:
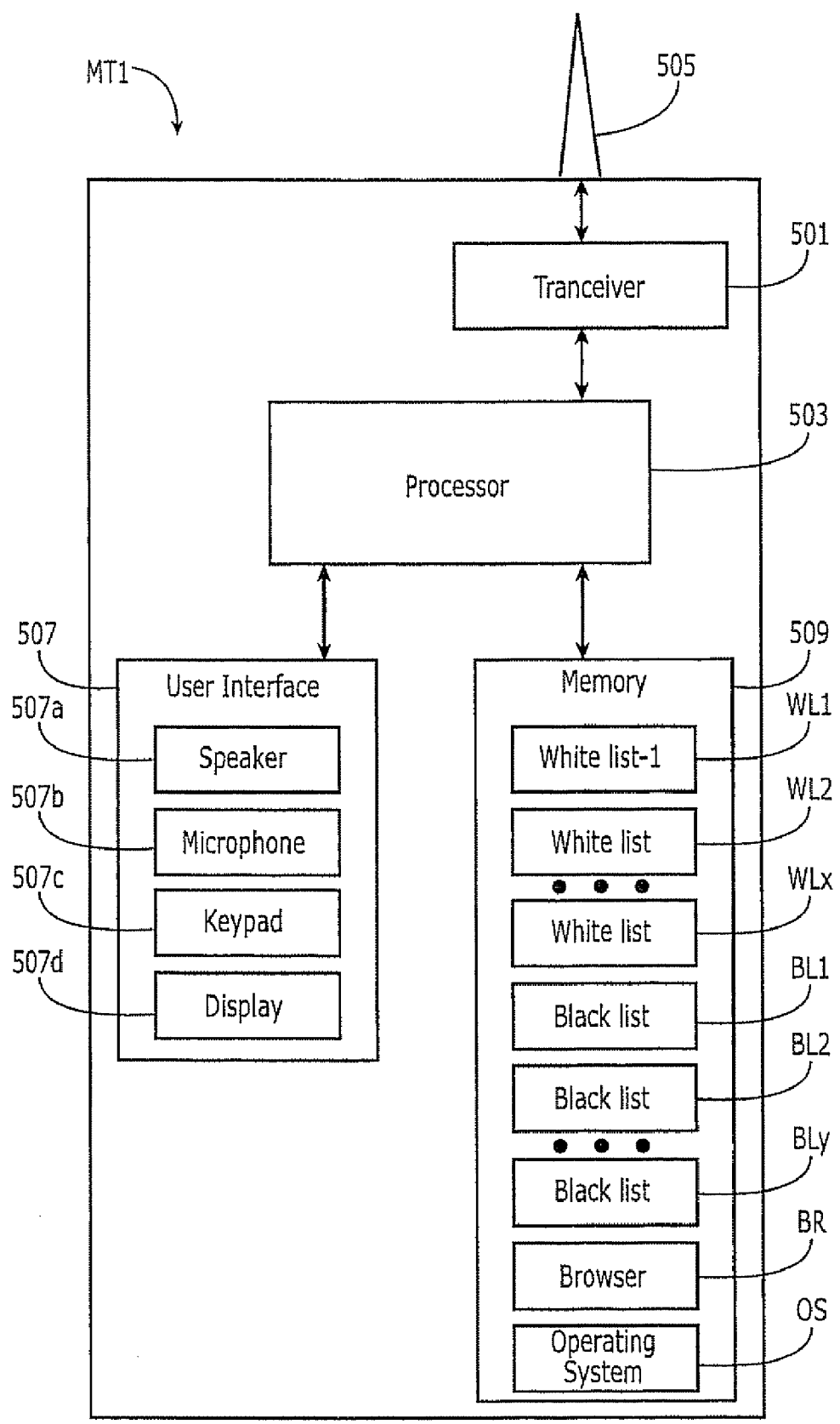
FIG. 2 is a block diagram of a mobile terminal according to some embodiments of the present invention.

FIG. 2 is a block diagram showing mobile terminal MT1 according to some embodiments of the present invention. Mobile terminal MT1 may include a transceiver 501 coupled between a processor 503 and an antenna 505, with a user interface 507 and a memory 509 also coupled to the processor 503. The user interface 507 may include, for example, a speaker 507a, a microphone 507b, a keypad 507c, a display 507d, etc. The memory may include, for example, an operating system OS, a browser BR, and a plurality of lists such as a plurality of whitelists WL1-WLx and/or a plurality of blacklists BL1-Bly. The mobile terminal MT1 may thus be a wireless mobile terminal (such as a cellular radiotelephone) that transmits/receives communications through the transceiver 501 and antenna 505

When the mobile terminal MT1 is manufactured, non-volatile portions of memory 509 may be programmed with one or more lists (such as one or more of whitelists WL1-WLx and/or blacklists BL1-Bly), with each list including an identification (such as a Uniform Resource Locator or URL for a remote server such as one of S1-Sm, an e-mail address, a telephone number for another mobile terminal, etc.) of one or more communications devices remote from the mobile terminal. Moreover, the lists (such as whitelists WL1-WLx and/or blacklists BL1-Bly) may be used to moderate communications allowed for the mobile terminal MT1.

A whitelist (such as one of WL1-WLx), for example, may be provided for a specified type of communications interaction (such as downloads from a remote server, information transmissions to a remote server or other device, e-mails, telephone calls, etc.), and the whitelist may be used to moderate communications so that the specified communications interaction type is allowed with remote communications devices having respective identifications included in the whitelist. According to some embodiments of the present invention, the specified communications interaction type may be blocked with remote communications devices having respective identifications not included in the list and/or user input may be required before proceeding. As shown in FIG. 2, different whitelists may be provided for different communications interaction types. For example, a first whitelist may be provided for URLs identifying acceptable remote servers for downloads to the mobile terminal, a second whitelist may be provided for URLs identifying acceptable remote servers for transmission of identification of the mobile terminal to the remote server, a third whitelist may be provided for e-mail addresses identifying acceptable e-mail sources, a fourth whitelist may be provided for telephone numbers identifying acceptable sources of incoming calls, etc.

A blacklist (such as one of BL1-BLx), for example, may be provided for a specified type of communications interaction (such as downloads from a remote server, information transmissions to a remote server or other device, e-mails, telephone calls, etc.), and the blacklist may be used to moderate communications so that the specified communications interaction type is blocked with remote communications devices having respective identifications included in the blacklist. According to some embodiments of the present invention the specified communications interaction type may be blocked with remote communications devices having respective identifications included in the list and/or user input, such as a user defined authorization code (e.g., to allow parental control), may be required before proceeding. As shown in FIG. 2, different blacklists may be provided for different communications interaction types. For example, a first blacklist may be provided for URLs identifying unacceptable remote servers for downloads to the mobile terminal, a second blacklist may be provided for URLs identifying unacceptable remote servers for transmission of identification of the mobile terminal to the remote server, a third blacklist may be provided for e-mail addresses identifying unacceptable e-mail sources, a fourth blacklist may be provided for telephone numbers identifying unacceptable sources of incoming calls, etc.

Moderating communications may include blocking communications with a remote communications device based on the list in the memory. For example, a whitelist may be used to block communications with remote communications devices not identified in the whitelist, and/or a blacklist may be used to block communications with remote communications devices identified in the blacklist. As used herein, the term blocking may include absolutely blocking a communication or conditionally blocking a communication (with the communication being allowed only after user acceptance). In addition or in an alternative, moderating communications may include allowing communications with a remote communications device based on the list in the memory. For example, a whitelist may be used to allow communications with remote communications devices identified in the whitelist, and/or a blacklist may be used to allow communications with remote communications devices not identified in the blacklist.

According to some embodiments of the present invention, a whitelist and/or a blacklist may be used to moderate provision of an identification of the mobile terminal, such as an IMEI (International Mobile Equipment Identity) or ESN (Electronic Serial Number), with a remote communications device based on the respective whitelist/blacklist in the memory 509. In particular, a remote server may provide a same standard of service for any mobile terminal for which the identification of the mobile terminal is not known by the server and a customized standard of service if the identification of the mobile is known by the server. More particularly, a server may provide special services (such as e-mail, custom news flashes, etc.) if the mobile terminal is identified. An unscrupulous server operator, however, might use an identification of a mobile terminal fraudulently (such as to clone a mobile terminal). Accordingly, a whitelist may be used to designate acceptable recipients of a mobile terminal identification, and/or a blacklist may be used to designate unacceptable recipients of a mobile terminal identification.

According to some other embodiments of the present invention, a whitelist and/or a blacklist may be used to moderate acceptance of a specified data type (such as a Digital Rights Management or DRM license) at the mobile terminal from a remote communications device based on the list in the memory 509. When downloading digital content (such as music) to the mobile terminal, for example, a DRM license may be required to allow use of the content (according to any restrictions designated by the license). All remote servers, however, may not be acceptable sources of DRM licenses. Accordingly, a whitelist may be used to designate acceptable sources of DRM licenses and/or a blacklist may be used to designate unacceptable sources of DRM licenses.

As discussed above, a list (such as one of a whitelist WL1-WLx and/or blacklist BL1-Bly) may include identifications of remote communications devices. In addition, a list may include respective conditional information associated with each of the identifications. The conditional information, for example, may include a time period (one time or recurring) over which the respective identification in the list is valid, a termination time when the respective identification in the list is no longer valid, and/or a start time when the respective identification in the list becomes valid.

One or more of the lists WL1-WLx and/or BL1-Bly may be programmed into non-volatile portions of memory 509 by a manufacturer of the mobile terminal MT1 and/or by a communications service provider (operating mobile telephone switching offices MTSO1-MTSOk and base stations BS1-BSi) before being provided (e.g., sold) to a customer. Moreover, the processor 503 and/or the memory 509 may be configured to allow remote reprogramming (e.g., adding and/or deleting entries) of one or more of the lists by a remote entity (e.g., a manufacturer of the mobile terminal, a communications service provider for the mobile terminal, an employer of a user of the mobile terminal, etc.). The manufacturer, for example, may be allowed to reprogram a whitelist(s)/blacklist(s) identifying appropriate/inappropriate sources of software updates of the operating system OS and/or browser BR. The service provider may be allowed to reprogram a whitelist(s)/blacklist(s) identifying appropriate/inappropriate sources of DRM licenses and/or appropriate/inappropriate recipients of a mobile terminal identification. An employer may be allowed to reprogram a whitelist(s)/blacklist(s) identifying appropriate/inappropriate sources of received e-mails (e.g., for spam blocking). A user of the mobile terminal MT1 may be blocked from reprogramming lists that are reprogrammable by one or more remote entities, or reprogramming by a user may be allowed.

The processor 503 may thus allow/block communications using identifications and any other information included in one or more whitelists/blacklists of memory 509. Over time, however, acceptable/unacceptable remote sources/recipients of information may change as addresses of remote communications devices change, as new remote communications devices become accessible, as previously existing remote communications devices become inaccessible, and/or as a nature of previously existing remote communications devices changes. Accordingly, whitelists/blacklists of memory 509 may need to be revised over time with addition of identifications, deletions of identifications, and/or revisions of information relating to identifications.

Accordingly, an update for a list may be received from outside the mobile terminal over a wireless link. As shown in FIGS. 1 and 2, for example, any update may be transmitted from base station BS1 over a wireless link to antenna 505, and the transceiver 501 and the processor 503 may process the update to modify (reprogram) the appropriate list in memory 509. The update, for example, may be received from a remote server operated by the manufacturer of the mobile terminal MT1, the service provider providing communications service for the mobile terminal MT1, and/or an employer of a user of the mobile terminal MT1. Accordingly, the update may be transmitted over the network NET (such as the Internet), through mobile telephone switching office MTSO1 and base station BS1 to the mobile terminal MT1. The update may include an identification of a remote communications device, an identification of the appropriate list, an activity designation (e.g., delete the identification from the list, add the identification to the list, modify information in the list associate with the identification, etc.), and other information associated with the identification of the remote communications device. The update may also include verification/authentication information allowing the processor to verify/authenticate that the update should be accepted.

Once the update is received, the processor 503 may automatically update the appropriate list in the memory of the mobile terminal after receiving the update from outside the mobile terminal. The processor 503 may be configured to proceed with the update without requiring user intervention, or the processor 503 may require user acceptance before proceeding. Moreover, the update may include information instructing the processor 503 to proceed with the update without requiring user intervention, or the processor 503 may require user acceptance before proceeding with the update. Once an update for a list has been entered, subsequent communications relating to the list can be moderated based on the list including the update. Accordingly, different lists may be updated at different times by different entities.

An update from a remote entity may include a new identification of a communications device remote from the mobile terminal MT1 not previously included in the list, and the processor 503 may automatically update the list by adding the new identification to the appropriate list in memory 509 after receiving the update from outside the mobile terminal MT1 through the antenna 505 and the transceiver 501. An update from a remote entity may include an existing identification of a communications device remote from the mobile terminal MT1 already included in the list, and the processor 503 may automatically update the list by removing the existing identification from the list in memory 509 after receiving the update from outside the mobile terminal MT1 through the antenna 505 and the transceiver 501. An update from a remote entity may include an identification of a communications device remote from the mobile terminal MT1 together with a time constraint (i.e., a range of times, a beginning time, an termination time, etc.) associated with the identification of the communications device remote from the user terminal. The time constraint may be used by the processor 503 to modify information associated with an identification already included in a list, or if the time constraint is received with an identification to be added to a list, both the identification and the time constraint may be added to the list.

An update may be initiated in response to a user of the mobile terminal MT1 accessing a remote server providing the update, and/or an update may be initiated by a remote entity transmitting the update to the mobile terminal MT1 without prior action on the part of the user and/or the mobile terminal MT1. According to some embodiments of the present invention, a communication may be established with a remote server using the browser application BR, the processor 503, and the transceiver 501 of the mobile terminal MT1, and then the update may be received from the remote server using the browser application BR. More particularly, a user of the mobile terminal MT1 may initiate a client-server interaction with a remote server (operated, for example, by an employer, a communications service provider, or a manufacturer of the mobile terminal MT1) using browser application BR, and the update may be transmitted by the remote server and received at the mobile terminal MT1 as a content object. The content object, for example, may be a Ticket object, and/or the content object may have an MIME (Multipurpose Internet Mail Extensions) type. Moreover, the update may be received according to an HTTP (Hypertext Transfer Protocol) protocol and/or an OBEX (OBject EXchange) protocol. According to some other embodiments of the present invention, the update may be received in a message provided according to a radiotelephone communications protocol such as an SMS (Short Message Service) message initiated by a remote entity.

If the update is received as a ticket object, for example, the ticket object may be embedded in a webpage that is accessed by a user of the mobile terminal MT1 through the mobile terminal MT1 using browser application BR. More particularly, the ticket object may be embedded in a webpage provided, for example, by an employer, a communications service provider, or a manufacturer of the mobile terminal MT1), and when the mobile terminal MT1 accesses this webpage using browser application BR, the embedded ticket object may update an associated list in memory 509 of mobile terminal MT1 without requiring a direct download.

In addition, the processor 503 may verify that the update is received from a trusted source before automatically updating the list. For example, the update may be provided as a content object with an electronic signature used by the processor 503 to verify the identity of the source.

Moreover, the processor 503 may be configured to apply different updates received from different remote entities to respective associated lists in memory 509, and the processor 503 may be configured to block application of updates received from remote entities to unassociated lists in memory 509. For example, first and second lists may each include respective identifications of communications devices remote from the mobile terminal MT1. A first update may be received for the first list from a first source remote from the mobile terminal MT1, and a second update may be received for the second list from a second source remote from the mobile terminal MT1. Accordingly, the first list may be automatically updated using the first update received from the first source, and the second list may be automatically updated using the second update received from the second source. Moreover, updating the first list responsive to updates received from the second source may be blocked, and updating the second list responsive to updates received from the first source may be blocked.

Figure 3:
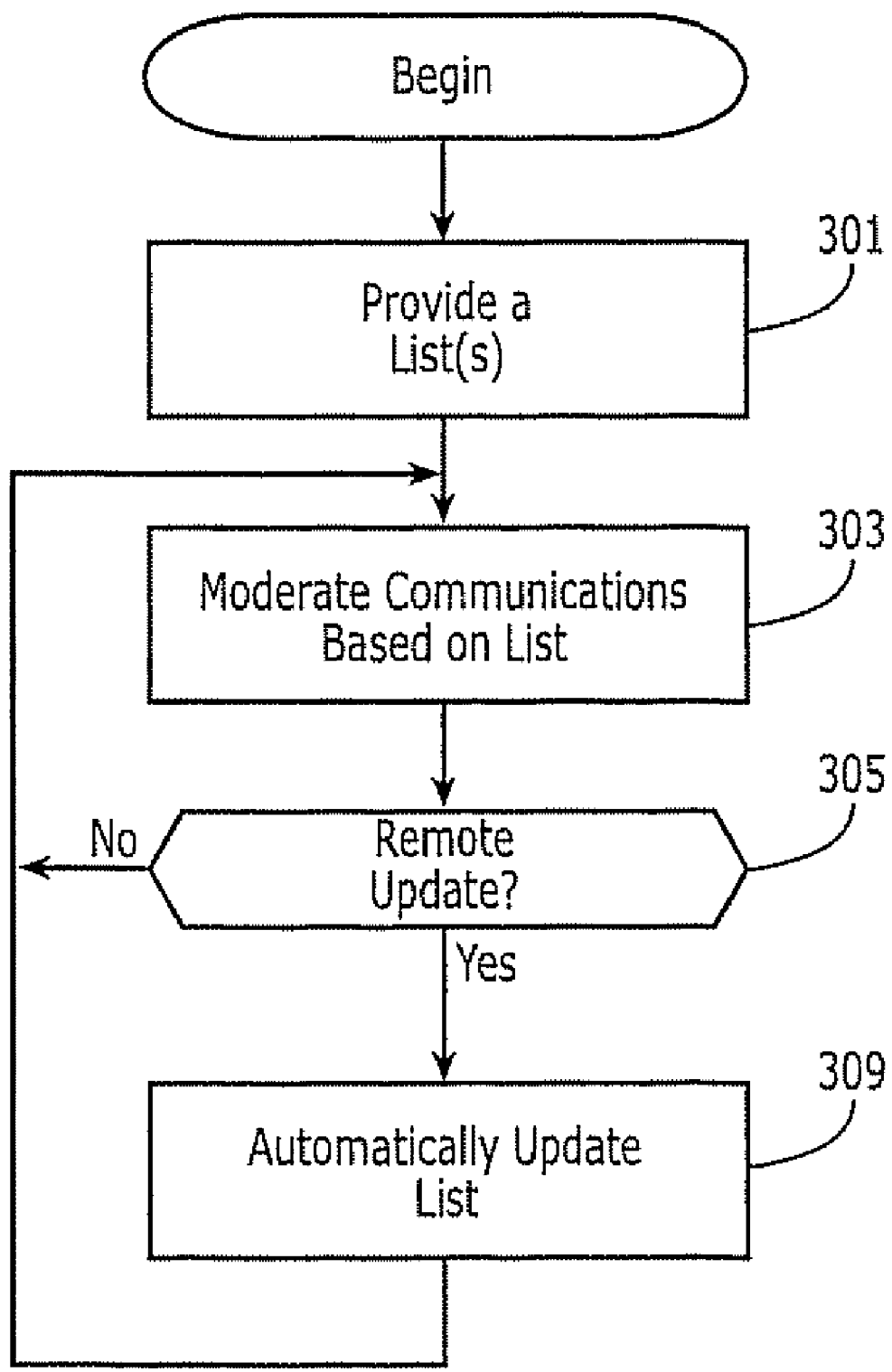
FIG. 3 is a flow chart illustrating operations of mobile terminals according to some embodiments of the present invention.

FIG. 3 is a flow chart illustrating operations of updating a list (such as a whitelist and/or a blacklist) in a mobile terminal MT1 according to some embodiments of the present invention. At block 301, a list may be provided in memory of the mobile terminal, and the list may include at least one identification of a communications device remote from the mobile terminal, and at block 303, communications with the mobile terminal MT1 may be moderated based on the list in the memory. If an update for the list is received from outside the mobile terminal over a wireless link at block 305, the list may be automatically updated in the memory of the mobile terminal at block 309, and then, communications may be moderated based on the updated list in the memory at block 303.

Operations of FIG. 3 may be performed by the processor 503 of the mobile terminal MT1 for any number of lists (such as whitelists WL1-WLx and/or blacklists BL1-Bly) stored in memory 509 of the mobile terminal MT1. The update may be received responsive to a request from the mobile terminal, during a client-server interaction with a server providing the update. For example, the update may be received at a content object (such as a Ticket object). In an alternative, the update may be initiated outside the mobile terminal and transmitted, for example, as a message provided according to a radiotelephone communications protocol (such as an SMS message). Moreover, a verification that the update is received from a trusted source may be performed before automatically updating the list. For example, the update may be provided with an electronic signature used to verify the identity of the source.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of operating a mobile terminal, the method comprising:
providing a whitelist/blacklist in memory of the mobile terminal wherein the whitelist/blacklist includes at least one identification of a communications device remote from the mobile terminal;
receiving an update at the mobile terminal for the whitelist/blacklist from outside the mobile terminal over a wireless link;
automatically updating the whitelist/blacklist in the memory of the mobile terminal responsive to receiving the update at the mobile terminal from outside the mobile terminal over the wireless link; and
moderating communications based on the whitelist/blacklist in the memory;
wherein providing a whitelist/blacklist comprises providing first and second whitelists/blacklists with each whitelist/blacklist including at least one identification of a communications device remote from the mobile terminal, wherein receiving an update comprises receiving a first update for the first whitelist/blacklist from a first source remote from the mobile terminal and receiving a second update for the second whitelist/blacklist from a second source remote from the mobile terminal, and wherein automatically updating the whitelist/blacklist comprises automatically updating the first whitelist/blacklist using the first update received from the first source and automatically updating the second whitelist/blacklist using the second update received from the second source.

2. The method according to claim 1 wherein the whitelist/blacklist comprises a whitelist for a specified communications interaction, and wherein moderating communications comprises allowing the specified communications interaction with remote communications devices having respective identifications included in the whitelist.

3. The method according to claim 1 wherein the whitelist/blacklist comprises a blacklist for a specified communications interaction, and wherein moderating communication comprises blocking the specified communications interaction with remote communications devices having respective identifications included in the blacklist.

4. The method according to claim 1 wherein moderating communications comprises moderating provision of an identification of the mobile terminal to a remote communications device based on the whitelist/blacklist in the memory of the mobile terminal.

5. The method according to claim 1 wherein moderating communications comprises moderating acceptance of a specified data type at the mobile terminal from a remote communications device based on the whitelist/blacklist in the memory of the mobile terminal.

6. The method according to claim 1 wherein moderating communications comprises blocking communications with a remote communications device based on the whitelist/blacklist in the memory.

7. The method according to claim 1 wherein receiving the update comprises receiving a new identification of a communications device remote from the mobile terminal not previously included in the whitelist/blacklist, and wherein automatically updating the whitelist/blacklist comprises adding the new identification to the whitelist/blacklist in memory without user intervention responsive to receiving the update at the mobile terminal from outside the mobile terminal.

8. The method according to claim 1 wherein receiving the update comprises receiving an existing identification of a communications device remote from the mobile terminal already included in the whitelist/blacklist, and wherein automatically updating the whitelist/blacklist comprises removing the existing identification from the whitelist/blacklist in memory without user intervention responsive to receiving the update at the mobile terminal from outside the mobile terminal.

9. The method according to claim 1 wherein receiving the update comprises receiving an identification of a communications device remote from the mobile terminal together with a time constraint associated with the identification of the communications device remote from the user terminal.

10. The method according to claim 1 further comprising:
before receiving an update for the whitelist/blacklist, establishing a communication between the mobile terminal and a remote server using a browser application of the mobile terminal, wherein receiving the update at the mobile terminal comprises receiving the update at the mobile terminal from the remote server using the browser application.

11. The method according to claim 10 wherein receiving the update from the remote server comprises receiving the update as a content object.

12. The method according to claim 11 wherein the content object comprises a Ticket object.

13. The method according to claim 11 wherein the content object has an MIME (Multipurpose Internet Mail Extensions) type.

14. The method according to claim 1 wherein receiving the update comprises receiving the update according to an HTTP (Hypertext Transfer Protocol) protocol and/or an OBEX (OBject EXchange) protocol.

15. The method according to claim 1 further comprising:
before automatically updating the whitelist/blacklist, verifying that the update is received from a trusted source.

16. The method according to claim 1 wherein receiving the update comprises receiving the update in a message provided according to a radiotelephone communications protocol.

17. The method according to claim 16 wherein receiving the update comprises receiving the update in an SMS (Short Message Service) message.

18. The method according to claim 1 further comprising blocking updating the first whitelist/blacklist responsive to updates received from the second source and blocking updating the second whitelist/blacklist responsive to updates received from the first source.

19. The method according to claim 1 wherein the first whitelist/blacklist is associated with a first verification and the second whitelist/blacklist is associated with a second verification different than the first verification, wherein automatically updating the first whitelist/blacklist includes verifying the first update according to the first verification, and wherein automatically updating the second whitelist/blacklist includes verifying the second update according to the second verification.

20. The method according to claim 19 wherein the first update comprises a first ticket object including a first signaling portion, wherein the second update comprises a second ticket object including a second signaling portion, wherein verifying the first update comprises verifying the first update using the first signaling portion according to the first verification, and wherein verifying the second update comprises verifying the second update using the second signaling portion according to the first verification.

21. The method according to claim 1 further comprising:
providing a radiotelephone communication with another terminal.

22. The method according to claim 1 wherein the whitelist/blacklist includes a plurality of identifications corresponding to a respective plurality of communications devices remote from the mobile terminal, wherein the update includes one of the identifications and an activity type, and wherein automatically updating the whitelist/blacklist comprises updating the whitelist/blacklist based on the identification and the activity type included in the update.

23. The method according to claim 22 wherein the activity type includes one of a delete activity type, a modify activity type, or an add activity type.

24. The method according to claim 23 wherein the activity type includes the delete activity type and wherein updating the whitelist/blacklist comprises deleting the identification included in the update from the whitelist/blacklist.

25. The method according to claim 23 wherein the activity type includes the modify activity type, and wherein updating the whitelist/blacklist comprises modifying information in the whitelist/blacklist associated with the identification included in the update.

26. The method according to claim 25 wherein the update includes a time constraint and wherein modifying information in the whitelist/blacklist includes providing the time constraint for the identification in the whitelist/blacklist.

27. The method according to claim 23 wherein the activity type includes the add activity type, and wherein updating the whitelist/blacklist comprises adding the identification included in the update to the whitelist/blacklist.

* * * * *